United States Patent [19]

Fowler

[11] 4,211,620
[45] Jul. 8, 1980

[54] METHOD OF AND APPARATUS FOR PRODUCING HYDROGEN AND OXYGEN BY PHOTOELECTRICALLY-INDUCED ELECTROLYSIS

[75] Inventor: Herbert Fowler, Lexington, Ky.

[73] Assignee: Childers-Fowler Research and Development Company, Lexington, Ky.

[21] Appl. No.: 44,650

[22] Filed: Jun. 1, 1979

[51] Int. Cl.² .................. C25B 1/04; C25B 9/00; C25B 9/04
[52] U.S. Cl. .................. 204/129; 204/157.1 R; 204/194; 204/278; 204/DIG. 11
[58] Field of Search ........ 204/129, 157.1 R, DIG. 11, 204/194, 278

[56] References Cited

U.S. PATENT DOCUMENTS

| | | | |
|---|---|---|---|
| 3,925,212 | 12/1975 | Tchernev | 204/157.1 R |
| 4,045,315 | 8/1977 | Fletcher | 204/157.1 R |
| 4,105,517 | 8/1978 | Frosch | 204/157.1 R |

FOREIGN PATENT DOCUMENTS 2301709  2/1975  France ............................ 204/129

Primary Examiner—R. L. Andrews
Attorney, Agent, or Firm—Quaintance, Murphy & Richardson

[57] ABSTRACT

Hydrogen and Oxygen are produced by photoelectrically-induced electrolysis wherein solar and/or laser light is passed through a thin layer of a water-caustic soda solution to ionize the solution adjacent an anode. A cathode spaced from the anode and connected thereto by a diode circuit, including a resistance, is used to prevent current flow between the anode and cathode until the potential therebetween exceeds a threshold two volts and preferably 2.4 volts. Upon sufficient ionization in the thin layer of solution, the potential between the anode and cathode exceeds the threshold and current flows therebetween, causing hydrogen gas to form at the cathode. Circulation of the solution between the anode and cathode is caused by convection due to heating of the fluid with solar or laser light.

20 Claims, 2 Drawing Figures

4,211,620

METHOD OF AND APPARATUS FOR PRODUCING HYDROGEN AND OXYGEN BY PHOTOELECTRICALLY-INDUCED ELECTROLYSIS

BACKGROUND OF THE INVENTION

1. Field of the Invention

This invention relates to methods of and apparatus for producing hydrogen and oxygen gas from water by electrolysis, and more particularly, this invention relates to methods of an apparatus for generating hydrogen and oxygen gas from water by electrolysis using photoelectric phenomenon.

2. Technical Considerations and Prior Art

Generation of hydrogen and oxygen gas by electrolysis of water is a widely practiced technique which has been known for generations. Electrolysis requires electrical power to create a current between an anode and cathode in order to break water into its hydrogen and oxygen components. In recent years, great concern has been expressed as to a pending energy crisis. Hydrogen is a clean, plentiful and readily usable fuel. An efficient, economical method of producing hydrogen from water can greatly improve the chances for relieving this crisis. Consequently, there is now a great deal of effort being expended to develop new and efficient techniques for producing hydrogen.

In order to reduce or eliminate the need for an external energy source to produce hydrogen (and hydrocarbons), solar energy is being explored as an energy source. One approach being actively explored is chemical processes which resemble photosynthesis in order to convert water and air into combustible hydrocarbons. Another approach, which is the approach taken by the instant invention, is to accomplish production of hydrogen gas by using sunlight to effect electrolysis of water. Generally, the emphasis with electrolysis has been to use some type of exotic solid state photoelectric cell to generate current and release hydrogen and oxygen. To date, the solid state photoelectric approach has not proven economically fruitful.

SUMMARY OF THE INVENTION

In view of the foregoing considerations, it is an object of the instant invention to provide a new and improved method of an apparatus for generating hydrogen and oxygen by photoelectrically-induced electrolysis.

In view of the foregoing object, and other objects, the instant invention contemplates a method of producing hydrogen and oxygen from an electrolytic solution in an electrolytic cell by, in essence, forming a relatively thin layer of the electrolytic solution adjacent to an anode and then passing light through the relatively layer to ionize the electrolytic solution and thereafter moving the electrolytic solution over a cathode electrically connected to the anode to generate hydrogen gas on the cathode. In a preferred embodiment, the light passed through the relatively thin layer of electrolytic solution is sunlight. The instant invention further contemplates applying the light in the form of a laser beam.

According to the instant invention, an apparatus for practicing the method includes a container for containing the electrolytic solution, the container having a transparent face thereon and an anode disposed adjacent to the transparent face to form a relatively thin space between the face and anode. The thin space retains a thin layer of electrolytic solution which is ionized by light passing through the transparent face. A cathode, spaced from the anode, separates hydrogen gas from the electrolytic solution as the solution circulates and a diode circuit, including a resistance, prevents current from flowing between the cathode and anode until there is sufficient potential therebetween to effect the electrolysis process.

DESCRIPTION OF THE PREFERRED EMBODIMENT

Figure 1:
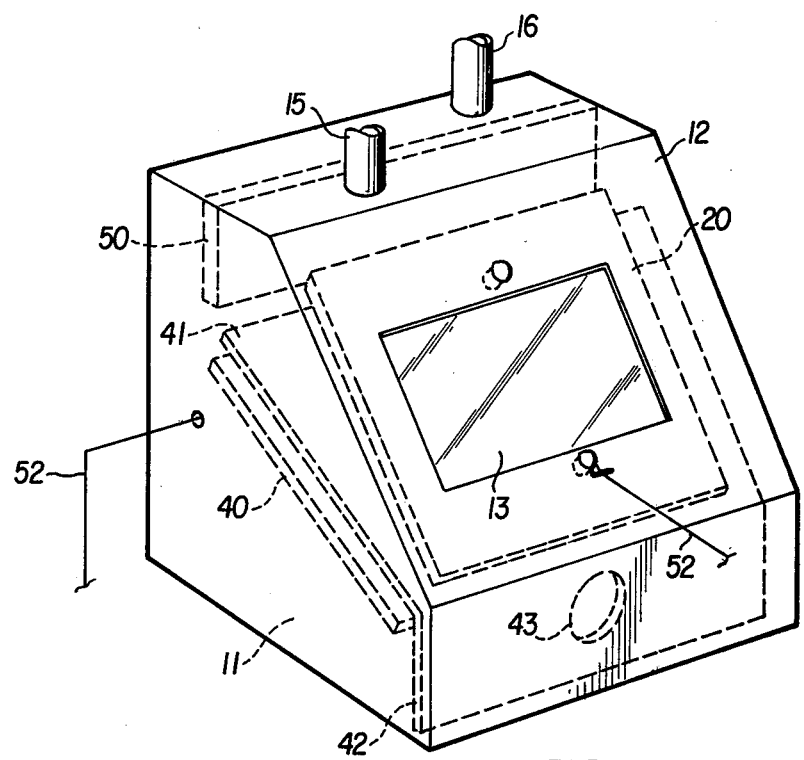
FIG. 1 is a prospective view of apparatus according to the instant invention showing a container for containing an electrolytic solution within the container illustrated in phantom.
Figure 2:
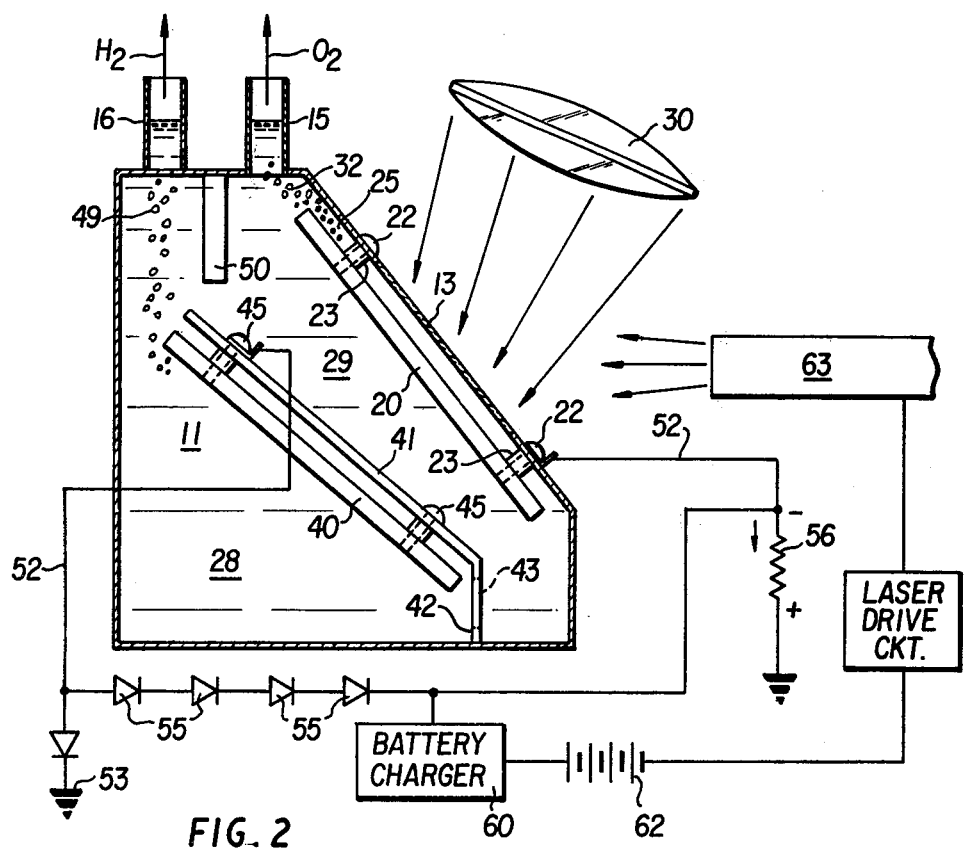
FIG. 2 is a side view of the apparatus showing the container with one wall removed so as to illustrate the various spacial and angular relationships between components and the container.

Referring now to the drawings, there is shown a container, generally designated aby the numeral 10, which contains an electrolytic solution 11 that is preferably 75% water and approximately 25% caustic soda or sodium hydroxide (NaOH). The tank is made of or at lease lined with insulating materials and formed therein for admitting light. Preferably, the transparent section 13 is made of quartz so as to admit ultraviolet light. The container 10 has a horizontal top surface 14 with a pair of pipes 15 and 16 to collect oxygen and hydrogen, respectively.

An anode 20 is positioned parallel with and in spaced relation adjacent to the transparent face plate 13. Preferably, the anode has an area twice as large as the area defined by the face plate 13. The anode 20 is preferably made of an alloy known as INCOLOY 800 which is immune to the corrosive effects of caustic soda. Two bolts 22 are used to retain the anode 20 on the supporting surface of transparent face plate 13. Bushings 23 on each of the bolts 22 hold the anode 20 spaced a distance of approximately one-tenth of an inch from transparent face plate 13 so as to define a space 25 therebetween which will accommodate a relatively thin layer of the electrolytic solution 11.

In accordance with one approach, sunlight is focused through a quartz magnifying lens 30 so as to pass through the transparent face plate 13 and the thin layer of electrolytic fluid in space 25. The light is focused at a point 31 behind the anode 20 so as to distribute light over the area presented by the thin layer of fluid in the space 25. The anode 20 is, of course, opaque so that no light passes therebeyond. As will be explained hereinafter, the sunlight ionizes the solution so as to split oxygen from the solution. The oxygen collects on the anode 20 in the form of bubbles 32 that bubble out of the solution and up through the oxygen collection pipe 15 for subsequent storage or other use.

A cathode 40 is retained within the container 10 on a flange 41 of insulating material which serves as a baffle to separate the container 10 into anode and cathode compartments 28 and 29 respectively. The baffle 40 is disposed at an angle to the horizontal and has a vertical flange 42 at the lower end thereof. The vertical flange 42 has an opening 43 therethrough which permits circulation of the electrolytic solution 11 between the anode and cathode compartments 28 and 29. The cathode 40 is mounted on the baffle 41 by bolts 45 having bushings 46 that hold the cathode in spaced relation to the baffle. When the cell is in operation, hydrogen collects on the cathode 40 in the form of bubbles 49 which are collected by the hydrogen outlet pipe 16 which is separated from the oxygen collection pipe 15 by a vertical baffle 50 projecting downwardly from the top surface 14 of the container 10.

The anode 20 and cathode 40 are electrically wired to one another by a line 52 which is grounded at 53 and 54. The line 52 includes a plurality of diodes 55 arranged in series with one another and a resistor 56 in parallel with the diodes 55. The resistor 56 and diodes 55 prevent current from flowing from anode 20 to cathode 40 until the potential difference therebetween exceeds two volts. Preferably, the resistance provided by the resistor 56 is sufficient to prevent current flow in the line 52 until the potential between the anode 20 and cathode 40 exceeds 2.4 volts at which time the four diodes 55 will become forward biased allowing current to flow from the anode 20 to the cathode 40.

The theory behind operation of the apparatus as described above is that electrolytic ionization can occur when an acid, base, or salt is dissolved in water or any other disassociating solvent, wherein a part or all of the molecules of the dissolved substance are ionized. Some of the ions are positively charged (cations) and an equivalent are negatively charged (anions). According to the Helmholtz double layer theory when a metal or other substance capable of existing in a solution of ions is placed in water, or any other disassociating solvent, a part of the metal or other substance passes into solution in the form of ions. The remainder of the metal or other substance is therefore left charged with an equivalent amount of electricity of opposite sign from that carried by the ions. A difference in potential between the metal and solvent therefore occurs. Accordingly, if the solution around one of the electrodes (anode 20 or cathode 40) is neutralized, the electrode will take back some of the electrons that the electrolytic solution took away. In the disclosed embodiment the solution 11 adjacent the anode 20 in the space 25 is neutralized by photons and thus the anode 20 becomes more negative than the cathode 40. Consequently, a difference in potential is set up between the anode 20 and cathode 40. Movement of current from the solution 11 into the anode 20 will decompose the caustic soda and water and oxygen ($O_2$) will form on the anode 20.

Since the space 25 between the transparent face plate 13 of the container 10 and the anode 20 is only approximately one-tenth of an inch, only a small portion of the total caustic soda content of the solution will be ionized by photons passing through the thin layer of solution in the space 25. Due to the small volume of solution, the ionization caused by the photons is of sufficient strength to break the NaOH into molecules. In order to most effectively accomplish this, the photons preferably have a frequency between the ultraviolet and green spectrum which requires that the magnifying lens 30 and transparent face plate 13 be made of a material such as quartz which will pass ultraviolet light. The light also heats the electrolytic solution 11 in the space 25 which causes that solution to rise toward the top of the container 10 and cooler solution to flow through the opening 43 connecting the anode compartment 28 to the cathode compartment 29 and into the space 25. The solution 11 is therefore circulated past the anode 20 and cathode 40 by convection.

If one assumes that before photon ionization takes place at the anode 20 there is no potential difference between the anode 20 and cathode 40 then when there is a fresh supply of the electrons for the anode this relationship is changed and the cathode becomes positive with respect to the anode. This difference in potential occurs across the resistor 56. As mentioned before, when the potential exceeds 2.4 volts there is a forward bias on the diodes 55 and current flows through the wire 52 from the anode 20 to the cathode 40. The current also flows from the cathode 40 and into the solution 11 thereby creating more NaOH and also hydrogen gas ($H_2$) which collects on the cathode 40 and flows out of the hydrogen outlet 16.

Devices which rely on sunlight for their operation must contend with periods of cloudiness. In order to keep the apparatus of the instant invention functioning during cloudy periods a battery charger 60 is wired to the line 52 in order to charge a battery 62. The battery 62 is used to power a laser 63 which passes a scanning laser beam through the electrolyte in space 25 when there is insufficient sunlight through the magnifying lens 30. There are several approaches for making a laser beam scan. For example, the approach shown in U.S. Pat. No. 3,437,951 may be used.

In summary, neutralization by photons of the electrolytic solution 11 in a surface area approximately one-half the size of the anode 20 generates electrons which are pulled out of the anode by the solution to thereafter move back into the anode creating a total circuit current flow.

The foregoing examples are merely illustrative of the invention which is to be limited only by the following claims.

I claim:

1. A method of producing hydrogen and oxygen from an electrolytic solution in an electrolytic cell comprising the steps of:
    forming a relatively thin layer of the electrolytic solution on an anode;
    passing light through the relatively thin layer to ionize the electrolytic solution in the relatively thin layer to form oxygen adjacent the anode and to heat the solution in the layer;
    circulating the fluid in the electrolytic cell due to heating of the relatively thin layer to move the solution past a cathode electrically connected to the anode,
    preventing current from flowing from between the cathode and anode until the potential reaches a predetermined threshold thereby generating hydrogen gas at the cathode, and
    collecting the hydrogen gas as the gas forms at the cathode.

2. The method of claim 1 wherein sunlight is passed through the relatively thin layer.

3. The method of claim 2 further including the steps of:
    using a portion of the current generated in the electrolytic cell to charge a battery for operating the cell when there is insufficient sunlight.

4. The method of claim 3 further including the step of:
    driving a scanning laser with current stored in the battery and impinging light from the laser on the relatively thin layer of electrolytic solution.

5. The method of claim 2 further including the step of focusing sunlight through a magnifying device which passes ultraviolet light.

6. The method of claim 5 wherein the focal point of the sunlight is behind the anode.

7. The method of claim 1 wherein the light is obtained from a scanning laser beam.

8. An apparatus for producing hydrogen and oxygen from an electrolytic cell having electrolytic solution therein comprising:
   container means for containing the electrolytic solution;
   a transparent face on the container means for passing light;
   anode means disposed adjacent the transparent face to form a relatively thin space therebetween, wherein the space retains a thin layer of electrolytic solution;
   cathode means mounted in the container for maintaining an electrolytic current through the fluid with the anode means;
   means connecting the anode means to the cathode means for preventing current from flowing therebetween until the potential exceeds a predetermined level, and
   means associated with the cathode means to collect hydrogen gas bubbling therefrom.

9. The apparatus of claim 8 further including magnifying means for focusing solar radiation through the transparent face and relatively thin layer of electrolytic solution.

10. The apparatus of claim 9 wherein the magnifying means and transparent face are made of quartz to pass ultraviolet radiation.

11. The apparatus of claim 8 including battery means disposed in the wired curcuit between the anode means and the cathode means for storing a portion of the potential flowing there between and for powering the apparatus in the absence of sufficient sunlight.

12. The apparatus of claim 11 wherein a scanning laser is powered by the battery means so as to operate the cell when there is insufficient sunlight.

13. The apparatus of claim 8 further including:
   baffle means in the container dispose between the cathode means and anode means.

14. The apparatus of claim 8 wherein the means for prohibiting current flow until the potential difference between the anode means and cathode means exceeds a predetermined threshold comprises a wired circuit with diode means in parallel with resistance means wherein the value of the resistance means determines the potential threshhold.

15. The apparatus of claim 8 wherein the transparent face of the container and the anode means are parallel to one another and positioned at an angle with respect to the vertical.

16. The apparatus of claim 8 wherein the electrolytic solution is sodium hydroxide ($Na_2OH$).

17. The apparatus of claim 8 wherein the threshold level is approximately 2.4 volts.

18. The apparatus of claim 8 wherein the distance between the transparent face and anode is approximately one-tenth of an inch.

19. The apparatus of claim 8 further including laser means for applying light through the transparent face.

20. The apparatus of claim 8 further including scanning laser means for applying light through the transparent face.

* * * * *